United States Patent
Fischer

[15] 3,687,559
[45] Aug. 29, 1972

[54] APPARATUS FOR INSPECTING GLASS CONTAINERS OR THE LIKE

[72] Inventor: Knut Fischer, Obernkirchen, Germany

[73] Assignee: Herman Heye, Obernkirchen, Germany

[22] Filed: Nov. 24, 1970

[21] Appl. No.: 92,442

[30] Foreign Application Priority Data

Dec. 2, 1969  Germany..........P 19 60 326.0

[52] U.S. Cl. ..............................356/240, 250/223 B
[51] Int. Cl. ...........................................G01n 21/32
[58] Field of Search............356/240, 198; 250/223 B

[56] References Cited

UNITED STATES PATENTS

| | | | |
|---|---|---|---|
| 3,328,000 | 6/1967 | Rottman | 356/240 |
| 3,349,906 | 10/1967 | Calhoun et al. | 356/240 |
| 3,479,514 | 11/1969 | Kidwell | 356/240 |
| 3,588,258 | 6/1971 | Sendt | 356/240 |

Primary Examiner—Ronald L. Wibert
Assistant Examiner—Orville B. Chew, II
Attorney—Michael S. Striker

[57] ABSTRACT

Apparatus for the inspection of glass containers to detect cracks, voids, bubbles or other flaws has a rotary testing unit which carries one or more photoelectric detectors whose receivers transmit signals to one or more amplifiers on the testing unit in response to detection of flaws. The light supplying means of the detectors receive light from a light source which is stationary or shares the movements of the testing unit and such light supplying means include bars and/or fiber bundles of light conducting materials which conduct light from the light source and direct it against the selected portion or portions of the container which is to be inspected. The testing unit is movable axially toward and away from the container. The amplifiers receive current by way of a first slip ring on the testing unit, and the amplified signals are transmitted to an ejector for defective containers by way of a second slip ring.

17 Claims, 7 Drawing Figures

PATENTED AUG 29 1972

INVENTOR
Knut FISCHER
BY
[signature]
his ATTORNEY

INVENTOR
Knut FISCHER
BY
his ATTORNEY

APPARATUS FOR INSPECTING GLASS CONTAINERS OR THE LIKE

BACKGROUND OF THE INVENTION

The present invention relates to apparatus for the inspection of containers for the presence or absence of cracks, bubbles, voids, deviations from a desired shape and/or other defects, and more particularly to improvements in apparatus for the inspection or testing of containers or other articles consisting of light-transmitting material, particularly bottles, jars or like containers which consist at least in part of vitreous material.

Apparatus for inspection of glass bottles, jars or like containers employ one or more photoelectric detectors whose receivers produce signals when the light beams supplied by one or more light sources are deflected or otherwise affected by defects in the scanned portions of containers. U.S. Pat No. 3,245,533 discloses an apparatus for inspection of horizontal checks in glass containers wherein the light source is mounted in the interior of a cupped testing head whose internal surface reflects light and which is provided with at least one lens serving to condense the reflected light and to direct it against a selected portion of the glass container. The receiver which produces electric signals in response to detection of flaws is stationary and receives light signals by way of a light conducting element which is mounted at the exterior of the testing head.

A drawback of the patented apparatus is that its usefulness is limited to detection of horizontal checks in the walls of glass containers. Furthermore, the accuracy of the apparatus is not entirely satisfactory, mainly because the photoelectric receiver is remote from the point or points where the light rays are affected by flaws in the containers. The accuracy is further affected by the fact that light which is to produce signals is conveyed to the receiver by a substantial number of parts and along an elongated path. Moreover, the patented apparatus is quite complicated and its utility is rather limited.

SUMMARY OF THE INVENTION

An object of the invention is to provide an apparatus which can be utilized for detection of defects in a wide variety of glass containers or analogous articles, which can be readily converted for inspection of different types of containers and/or for detection of different defects, and which can be used for detection of flaws in hollow articles of circular or noncircular (e.g., oval) outline.

Another object of the invention is to provide an apparatus which is simple, wherein the parts are readily accessible for examination, replacement, repair or adjustment, which occupies little room, and which is sufficiently sensitive to detect even minor cracks or similar flaws in one or more selected portions of tested articles.

A further object of the invention is to provide an apparatus wherein the defects appear within a wide observation angle and with a high resolve, and wherein the location of flaws can be pinpointed with a high degree of accuracy.

The improved apparatus serves for the inspection of glass containers or analogous articles to detect the presence or absence of cracks, bubbles, voids, irregularities in shape and/or other defects, and comprises holding and centering means for locating an article to be inspected in a predetermined position at a testing or inspecting station, at least one light source, and a rotary testing unit having carrier means movable (preferably axially) to and from an operative position in which the carrier means is adjacent to an article at the testing station, and photosensitive detector means supported by the carrier means and including light conducting means serving to conduct light from the light source and having a portion which directs such light against at least one selected portion of an article at the testing station in the operative position of the carrier means. The detector means further comprises at least one photosensitive receiver mounted on the carrier means in such position that it produces signals when the light directed by the aforementioned portion of the light conducting means impinges on defects in the selected portion or portions of the article at the testing station. Such signals can be amplified (preferably by one or more amplifiers mounted on and rotatable with the carrier means) and utilized to effect ejection of defective articles, either from the testing station or from the path along which the articles travel while moving away from the testing station.

The detector means is preferably adjustable with reference to the carrier means so that it can scan different portions of a single type of articles or one or more selected portions of different types of articles.

The aforementioned amplifier is electrically connected with the receiver and with a source of electrical energy which is preferably remote from the testing unit (i.e., it need not share the rotary and other movements of the carrier means). The connection between the amplifier and the energy source then preferably comprises a slip ring which rotates with the carrier means and is electrically connected with the amplifier, and a brush which engages the slip ring (at least in the operative position of the carrier means) and is electrically connected with the energy source.

The light source can be mounted on the testing unit or it may be remote from the carrier means. If the light source shares the movements of the carrier means, it preferably includes one or more electric lamps which receive current in the same way as described above in connection with the amplifier, namely, by means of conductors including brushes and slip rings.

Slip rings and brushes can also be used to transmit signals from the receiver or amplifier to an ejector which is not mounted on the testing unit.

The novel features which are considered as characteristic of the invention are set forth in particular in the appended claims. The improved inspecting apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary vertical sectional view of the testing unit in a modified inspecting apparatus which is utilized for the testing of necks of glass bottles or the like;

DESCRIPTION OF THE PREFERRED EMBODIMENTS

Figure 1:
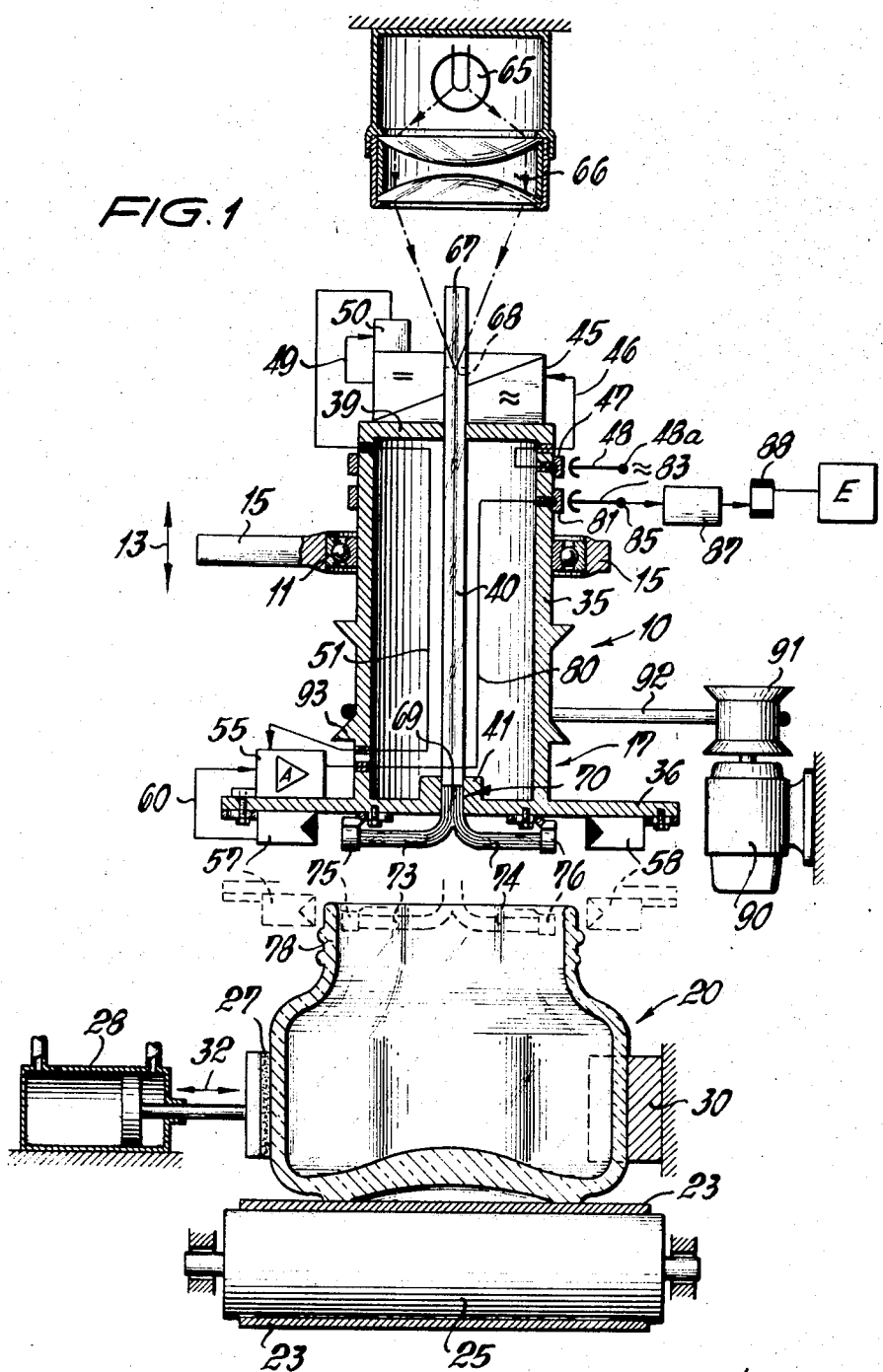
FIG. 1 is a fragmentary schematic partly elevational and partly vertical sectional view of an inspecting apparatus for glass containers which embodies one form of the invention and employs a fixedly mounted light source.

Referring first to FIG. 1, there is shown an apparatus for inspection of jars, mugs, bottles or analogous containers 20 preferably consisting of vitreous material. The purpose of the apparatus is to detect in the scanned portion or portions of each container the presence or absence of bubbles, voids, cracks, spots, irregularities in wall thickness or configuration and/or other defects, and to initiate the ejection or segregation of defective containers.

The apparatus of FIG. 1 comprises a testing unit 10 which is rotatable in an antifriction bearing 11 provided in a supporting arm 15. The latter is mounted in the frame (not shown) of the inspecting apparatus and is reciprocable in directions indicated by a double-headed arrow 13. Since the container 20 which is shown at the testing or inspecting station is held in an upright position so that its mouth 78 is located below and in registry with the testing unit 10, the supporting arm 15 is movable up and down, namely, toward and away from the mouth 78. Those parts of the inspecting apparatus which constitute the testing unit 10 are shown in positions they assume when the apparatus is utilized for inspection of the mouths 78 on successive containers 20. However, such parts can be readily mounted in a number of different ways so as to enable the apparatus to inspect one or more other portions of containers 20 (in addition to or instead of the inspection of the mouths 78. The testing unit 10 comprises a housing or casing 17 having a hollow upright cylindrical carrier 35 which is surrounded by the inner race of the antifriction bearing 11.

The means for transporting a succession of containers 20 to and from the testing station which accommodates the testing unit 10 comprises an endless conveyor belt 23 which is trained over rollers 25 (only one shown) and is driven at a constant (but preferably variable) speed by a suitable prime mover. The inspecting apparatus can be combined with a programming system which automatically arrests a container 20 when the container registers with the testing unit 10, which automatically lowers the supporting arm 15 when the container 20 is arrested at the testing station, and which thereupon automatically lifts the testing unit and inactivates the locating means for the container so that the latter can be transported again by the upper stretch of the conveyor belt 23. The programming operation can be triggered by a detector (not shown) which scans the path for the containers 20 and produces a signal in response to arrival of a container at the testing station.

The locating or positioning means for containers at the testing station comprises a single-acting or double-acting hydraulic or pneumatic cylinder 28 whose piston rod carries a clamping member or pusher 27 serving to engage the adjacent container 20 and to bias it against a stationary stop 30. The configuration of those surfaces on the pusher 27 and/or stop 30 which engage the container 20 is preferably complementary to the configuration of engaged surfaces on the container so that the latter is arrested and located in a position of accurate alignment double-acting the testing unit 10. The directions in which the pusher 27 is movable are indicated by a double-headed arrow 32. When a container 20 is held and centered between the parts 27 and 30, the upper stretch of the belt 23 continues to transport containers toward and away from the testing station. The valves which regulate the admission of a pressurized fluid to and its evacuation from the chambers of the cylinder 28 are preferably controlled by the aforementioned programming system of the inspecting apparatus. The supporting arm 15 can be moved up and down (arrow 13) by a double cylinder, a rack-and-pinion drive, an electromagnet or any other suitable reciprocating means (not shown) which can be controlled by the programming system to operate in synchronism with the cylinder 28.

The lower end portion of the carrier 35 is provided with a circular plate or bottom wall 36 which extends radially beyond and is secured to or integral with the carrier 35. The upper end portion of the carrier 35 is closed by a horizontal top wall 39. The top wall 39 has a centrally located opening for a solid light conducting rod 40 whose lower end portion 69 extends into a centrally located socket 41 of the bottom wall 36. The upper end portion 67 of the rod 40 extends well beyond the top wall 39; it descends to a level 68 (indicated by broken lines) when the testing unit 10 is caused to move to its lower or operative position in which the underside of the bottom wall 36 is closely or immediately adjacent to the top face of the mouth 78 of that container 20 which is centered at the testing station.

The upper end portion of the rod 40 extends through a rectifier 45 which is mounted on the top wall 39 of the carrier 35. A first slip ring 47 which surrounds the upper portion of the carrier 35 is connected with the input of the rectifier 45 by way of a lead 46. The slip ring 47 is rotatable with the carrier 35 relative to a brush 48 which is connected to one terminal 48a of a source of A-C current, for example, a transformer which supplies to the slip ring 47 current at a potential of 24 volts. The output of the rectifier 45 is connected with the input of a stabilizing circuit 50 by way of a lead 49. The circuit 50 is mounted on the top wall 39 so that it shares with the rectifier 45 all rotary and reciprocatory movements of the carrier 35. The output of the stabilizing circuit 50 is connected with the input of an amplifier 55 by way of a lead 51. The amplifier 55 is mounted on the upper side of the bottom wall 36 and is outwardly adjacent to the carrier 35. The lead 51 extends, at least in part, through the interior of the carrier 35. The amplifier 55 is adjustable with reference to the bottom wall 36.

The testing unit 10 further comprises two photoelectric detectors having receivers 57, 58 which are adjustably mounted at the underside of the bottom wall 36 so that each thereof can be moved in a plane which is parallel to the plane of the bottom wall and/or up and down, as viewed in FIG. 1. Such adjustability of the receivers 57, 58 enhances the versatility of the inspecting apparatus. The outputs of the receivers 57, 58 are connected with a second input of the amplifier 55 by way of leads 60 (only one shown). It is clear that the testing unit 10 may comprise several amplifiers, one for each of the photoelectric receivers. It is further clear that one of the receivers 57, 58 can be omitted, that the testing unit 10 can comprise more than two detectors, and that the illustrated receivers need not be mounted at the same level and/or at the same distance from the axis of the container 20 at the testing station.

The inspecting apparatus further comprises a light source 65 which is not supported by the testing unit 10. In the embodiment of FIG. 1, the light source 65 is stationary and emits light which is condensed by a condensor lens unit 66 and is directed into the upper end portion 67 of the light conducting rod 40. As shown, the condensed light beam enters the upper end portion 67 even when the latter descends to the level 68. The light beam propagates itself through the rod 40 and thereupon through a bundle 70 of light conducting fibers which abuts against the lower end portion 69 of the rod 40 and passes downwardly through a central opening of the bottom wall 36. The manner in which the light propagates itself through the rod 40 and bundle 70 is well known in the art.

The bundle 70 forms several smaller bundles or branches of filaments which are adjacent to the underside of the bottom wall 36. In the illustrated embodiment, the bundle 70 forms two branches 73, 74. The free end portions 75, 76 of the branches 73, 74 direct light against the internal surface of the mouth 78 when the testing unit 10 is moved to its operative position. The positions of the end portions 75, 76 in the interior of the mouth 78 are indicated by broken lines. The end portions 75, 76 are positioned in such a way that at least some of the emitted light rays reach the respective receivers 57, 58 when the light rays are deflected or otherwise affected by a defect in the scanned portion of the container 20 at the testing station. In FIG. 1, the photoelectric receivers 57, 58 and the associated end portions 75, 76 of the branches 73, 74 define two gaps each just wide enough to accommodate a portion of the mouth 78 in the lower end position of the testing unit 10.

The testing unit 10 is rotated at a constant or variable speed by a prime mover here shown as an electric motor 90 which drives the housing 17 by way of a belt transmission including a driver pulley 91 receiving motion from the output shaft of the motor 90, a driven pulley 93 which is mounted on or forms part of the carrier 35, and an endless belt 92 which is trained over the pulley 91, 93. The axial length of the pulley 93 is such that the testing unit 10 can be rotated in each axial position of the carrier 35.

The operation of the inspecting apparatus will be readily understood by referring to the preceding part of the description of FIG. 1. When the parts 27, 30 center and locate a container 20 at the testing station, the testing unit 10 is caused to descend to the broken-line operative position whereby the receivers 57, 58 rotate about and the end portions 75, 76 of the branches 73, 74 rotate within the mouth 78. The light emitted by end portions 75, 76 is directed against the inner side of the mouth 78 and reaches the respective receivers 57, 58 in response to deflection by a bubble, void, crack or other defect. The receivers 57, 58 then produce signals which are amplified at 55 and are transmitted to a second slip ring 81 on the carrier 35 by way of a lead 80 which passes through the interior of the hollow carrier. The slip ring 81 is engaged by a brush 83 which transmits the signals to a terminal 85 and thence to the input of a signal storing device 87. The latter transmits the signals with requisite delay to a relay 88 which is energized and actuates an ejector E serving to segregate the defective containers from satisfactory containers. For example, the ejector E may comprise a nozzle which is adjacent to the upper stretch of the belt 23 downstream of the testing station and discharges a stream of compressed air in response to energization of the relay 87. Such air stream can move the defective container off the upper stretch of the belt 23 and into a chute (not shown) for transport to a collecting station for defective articles.

An important advantage of the improved inspecting apparatus is that the receivers 57, 58 and those or (75, 76) of the light conveying means (40, 70, 73, 74, 75, 76) which direct light against selected portions (78) of articles (20) at the testing station can be mounted in close or immediate proximity of the articles. This enhances the resolve of the detectors. Furthermore, since the receivers 57, 58 and/or the end portions 75, 76 and fiber groups 73, 74 of the light conducting means are adjustable with reference to the bottom wall 36 of the carrier 35, the apparatus can be rapidly and readily converted for inspection of different portions of a certain type of articles o for inspection of one or more selected portions of different types of articles. The light conducting means can emit light in immediate proximity of the article which is located at the testing station while the testing unit 10 dwells in its operative position.

A light flash which reaches the revolving receiver 57 or 58 in response to detection of a minor flaw (e.g., a small crack in the wall of the mouth 78) is rather weak. Thus, the receiver then produces a weak signal whose generator resistance is very high. Therefore, the testing unit 10 is preferably provided with the aforementioned amplifier 55 which amplifies the signals from the receiver 57 and/or 58 so that such signals can be readily transmitted to the ejector E by way of the conductor system including the lead 80, slip ring 81, brush 83, terminal 85, storing unit 87 and relay 88. It was found that the transmission of signals from the receivers 57, 58 to the ejector E is improved to a surprising degree if the amplifier 55 is mounted on the testing unit 10 so that it can be directly connected with the outputs of the receivers. It is clear, however, that the conductors including the slip rings 47, 81 and brushes 48, 83 can be omitted if the apparatus is provided with means for wireless transmission of signals from the receiver or receivers of the detector means on the testing unit 10 to a stationary ejector or other signal receiving means. Another important advantage of a testing unit which carries the receiver or receivers of the detector means and one or more signal amplifiers is that the stray effect is practically nil, i.e., the distortion of signals is much less pronounced that in apparatus wherein the amplifiers receive signals by way of brushes and slip rings.

A stationary light source or a light source which might be adjustable but does not share the axial and rotary movements of the carrier 35 will be employed when the nature of testing operation and/or the nature of tested articles necessitates the use of a very strong light source. A heavy light source on the testing unit would contribute to the inertia of moving parts and would be affected by shocks whenever the testing unit comes to a stop in the illustrated idle position or in the operative position. Furthermore, a stationary light source can be placed at such a distance from the testing unit 10 that the sensitive parts on the carrier are not exposed to excessive temperatures. Also, a stationary light source is readily accessible at all times, for example, to permit rapid replacement of a light bulb. The light conducting means 40, 70, 73, 74, 75, 76, of FIG. 1 is capable of conveying large quantities of light into immediate proximity of the mouth 78 at the testing station, and the weight of such light conducting means is but a fraction of the weight of a large light source. Excessive heating by a light source mounted directly on the testing unit 10 could affect the electronic components of the circuitry in the inspecting apparatus.

It will be noted that the testing unit 10 shown in FIG. 1 supports the receivers 57, 58 and the end portions 75, 76 of fiber groups 73, 74 in positions which are required for inspection of mouths 78 of successive containers 20 on the belt 23. It is clear, however, that the parts 57, 58 and 75, 76 can be mounted well below the plane of the bottom wall 36 so that the apparatus can be used for inspection of one or more portions of containers which are located below the respective mouths. Also the bottom wall 36 can be replaced with a different support for the detectors (each such detector includes a photoelectric receiver and a light source) so that all parts of the detectors can be introduced into the interior of a container at the testing station.

The configuration of those surfaces on the end portions 75, 76 of the branches or groups 73, 74 which direct light against the internal surface of the mouth 78 is preferably selected in such a way that these surfaces emit light beams whose cross section has a certain width and height in contrast to light beams which merely illuminate a point or a line on the tested article. The adjustability of branches 73, 74 and their end portions 75, 76 enables the operator to place such parts at a desired distance from the axis of the carrier 35, from the bottom wall 36 and/or from the receivers 57, 58. At least the upper end portion 67 of the rod 40 is preferably coaxial with the carrier 35.

The purpose of the rectifier 45 and stabilizer circuit 50 is to insure that the amplifier 55 receives D-C current without excessive fluctuations in current strength. By mounting the parts 45, 50 on the testing unit 10, one insures that fluctuations in the supply of D-C current which is connected with the brush 48 as well as any temperature changes cannot affect the supply of current to the amplifier 55. The circuit 50 effects a desirable stabilization of D-C current which is supplied by the rectifier 45. In the absence of parts 45 and 50, the brush 48 and slip ring 47 could also affect the current which is supplied to the amplifier 55. The parts, 45, 50 occupy relatively little room and their weight is rather negligible so that they add little to the weight and bulk of the testing unit 10.

The testing unit 10 can be used with advantage in certain other types of testing or inspecting apparatus, for example, in apparatus for determining the internal diameters, the length, height or other characteristics of articles. The mounting of the testing unit in various types of inspecting apparatus necessitates only minor adjustments in the design of such apparatus because the output signal from the amplifier 55 is transmitted to the slip ring 81 which is readily accessible so that the output signal can be transmitted to the ejectors or other signal receiving means of such apparatus. The sensitivity of the detectors on the testing unit 10 can be varied within a wide range, for example, by appropriate selection of the light source 65, of the light conducting means 40, 70, 73, 74, 75, 76, of the distance between the end portions 75, 76 and the receivers 57, 58, of the amplifier 55, and/or the receivers 57, 58. The amplifier is preferably selected in such a way that the slip ring 81 can transmit to the ejector E signals without any further amplification of such signals.

Figure 2:
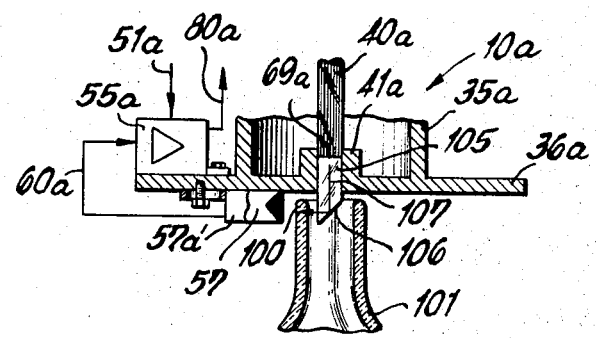

Referring to FIG. 2, there is shown a portion of a modified testing unit 10a which can be used for inspection of bottles 101 or analogous containers having a relatively narrow mouth or neck 100. Those parts of the second apparatus which are clearly identical with or analogous to the corresponding parts of the apparatus shown in FIG. 1 are denoted by similar reference numerals each followed by the character a. The solid rod 40 is replaced by a bundle 40a of light conducting fibers, and the lower end portion 69a of the bundle 40a is coupled to a solid light conducting tip 105 which has one or more facets 106 serving to direct light rays in the direction indicated by an arrow 107. Such light rays reach the receiver 57a in response to a deflection by a defect in the neck 100. The tip 105 enters the interior of the neck 100 when the testing unit 10a is moved to its operative position.

The tip 105 can be provided with two or more facets 106 each of which directs light against a separate receiver. FIG 2 shows, by way of example, a portion of a second receiver 57a' behind the receiver 57a. Thus, each of the receivers 57a, 57a' can receive light which is emitted by a separate facet 106 of the light conducting means. The dimensions of the lower end portion of the tip 105 can be readily selected in such a way that the lower end portion can enter the neck of a glass bottle or an analogous container. The receivers 57a, 57a' are outwardly adjacent to the neck 100 when the testing unit 10a assumes the illustrated operative position.

Figure 3:
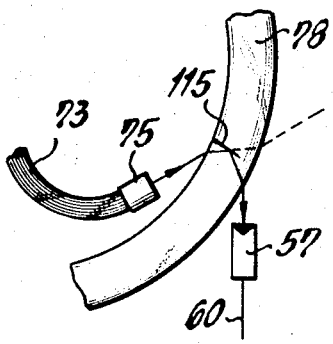
FIG. 3 illustrates the mounting of one of the detectors in the testing unit of the apparatus shown in FIG. 1.
Figure 4:
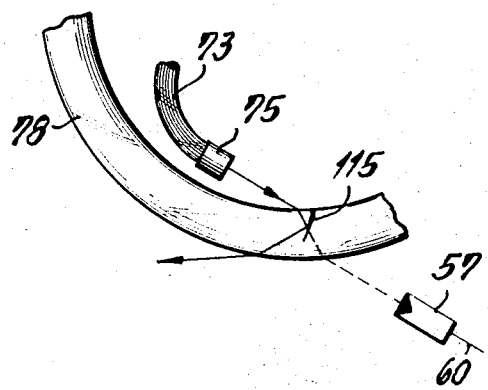
FIG. 4 illustrates a different mounting of a detector.
Figure 5:
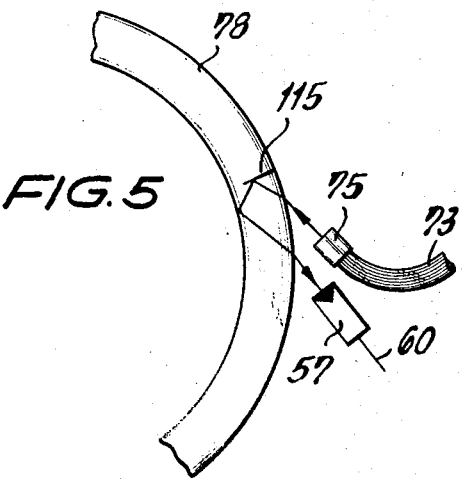
FIG. 5 illustrates still another mounting of a detector.

FIGS. 3, 4 and 5 illustrate various preferred positions of the end portion 75 of the group 73 of light conducting fibers with reference to the associated photosensitive receiver 57. The relative positions of the parts 57, 75 are selected in dependency on the nature of the intended inspection. In FIGS. 3 and 4, the parts 57, 75 are disposed at the opposite sides of the mouth 78 (it being assumed that the respective container 20 is centered at the testing station and that the testing unit 10 of FIG. 1 dwells in its operative position). In FIG. 5, the parts 57, 75 are outwardly adjacent to the mouth 78; such mounting is often preferred because these parts are readily accessible and can be observed at all times. In each instance, a crack 115 (shown in each of FIGS. 3 to 5) in the mouth 78 causes a deflection of at least a portion of light emitted by the end portion 75 whereby at least some of the deflected light reaches or bypasses the receiver 57 so that the latter produces a signal to initiate ejection of the defective container. The detectors of FIGS. 3 and 5 are so-called reflective detectors (the receiver produces a signal when it is exposed to light) whereas the detector of FIG. 4 constitutes a so-called absorptive detector whose receiver produces a signal when it is not exposed to light. The structure shown in FIG. 5 further relies on reflection of light at the internal surface of the mouth 78; this renders it possible to assemble the detector as a compact unit. The just described mounting and constructions of detectors in the testing unit are indicative of the versatility and convertibility of the improved inspecting apparatus.

Figure 6:
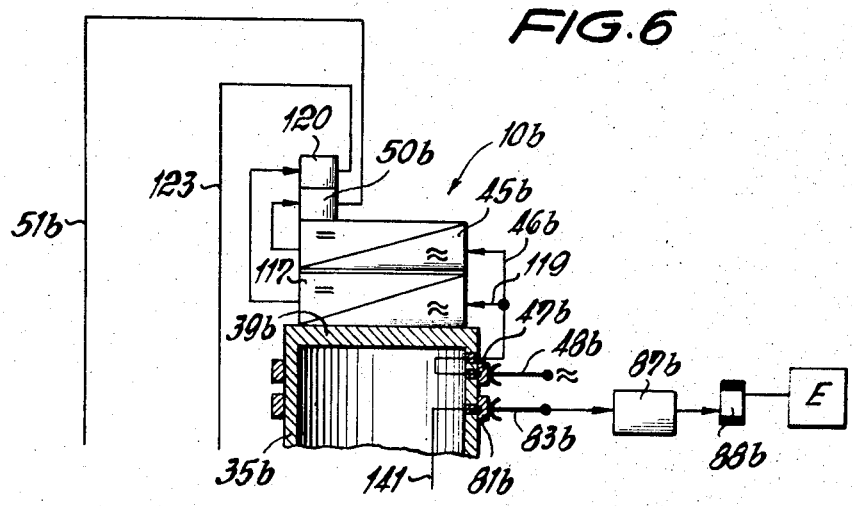
FIG. 6 is a fragmentary schematic partly side elevational and partly vertical sectional view of a further inspecting apparatus which employs a movable light source.
Figure 7:
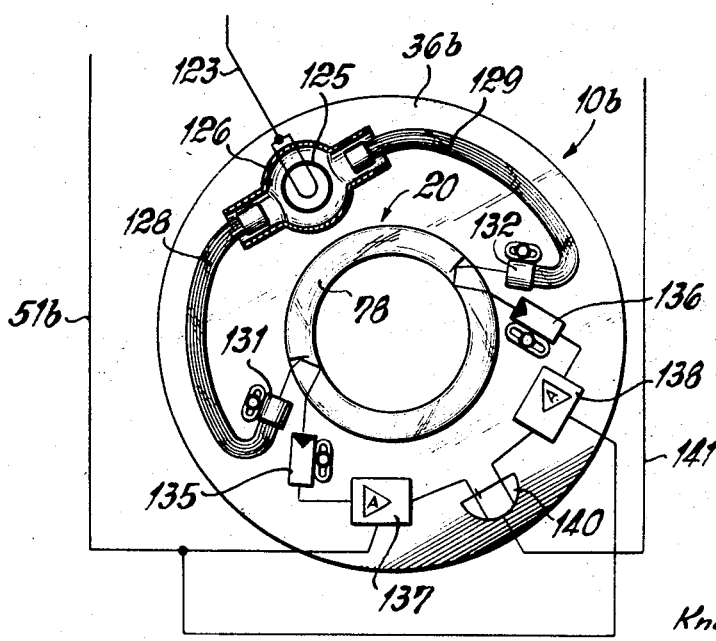
FIG. 7 is a diagrammatic bottom plan view of the testing unit in the inspecting apparatus of FIG. 6.

FIGS. 6 and 7 illustrate a portion of a further testing unit 10b which comprises a second rectifier 117 mounted between the top wall 39b and the rectifier 45b. The input of the rectifier 117 is connected with the slip ring 47b by way of a conductor 119, and its output is connected with a stabilizing circuit 120. The latter conducts current to a light source 125 by way of a conductor 123. In this embodiment of the invention, the light source 125 is adjustably mounted at the underside of the bottom wall 36b and includes a housing 126. Light which is emitted by the source 125 is conducted by two bundles 128, 129 of fibers whose end portions 131, 132 emit light against the outer side of the mouth 78 of a container at the testing station. The bundles 128, 129 are adjacent to the underside of the bottom wall 36b; their end portions 131, 132 respectively cooperate with photoelectric receivers 135, 136 in a manner as described in connection with FIG. 5. The outputs of the receivers 135, 136 are respectively connected with amplifiers 137, 138. These amplifiers receive current from the stabilizing circuit 50b by way of the lead 51b. The outputs of the amplifiers 137, 138 are connected with the inputs of a logical circuit here shown as an OR-gate 140 whose output is connected with the slip ring 81b by way of a lead 141. All other parts shown in FIGS. 6 and 7 but not specifically mentioned herein are analogous to the corresponding parts of the inspecting apparatus shown in FIG. 1 and are denoted by similar reference numerals each followed by the character b.

As stated before, the number of detectors in the testing unit of my improved inspecting apparatus will depend on the nature of tested containers and on the nature of the inspecting operation. The testing unit may be provided with a single detector or with three or more detectors. Furthermore, if the testing unit comprises several detectors, at least two detectors can be mounted at different levels so that each scans a different portion of an article at the testing station.

It is further within the purview of the present invention to modify the testing unit 10b of FIG. 7 by placing the light source 125 above the bottom wall 36b or into the interior of the carrier 35b. Such mounting of the light source reduces the likelihood of overheating the parts which are mounted at the underside of the bottom wall. The bundles 128, 129 then extend through openings provided in the bottom wall 36b or along a portion of the periphery of the bottom wall. Such bundles are sufficiently flexible to permit the placing of the end portions 132, 133 close to the respective receivers and/or to the mouth of an article at the testing station.

If the light source 125 produces substantial amounts of heat, it is preferably mounted above the bottom wall 36b and in such position that the emitted heat cannot affect the electronic and other sensitive components of the testing unit 10b. The mounting of the light source on the testing unit is preferred when the light source is rather small and when it is desired to reduce the light losses to a minimum by placing the light source close to the selected portion (78) or portions of the article at the testing station. The parts 117, 120 insure that the lamp of the light source 125 receives a constant supply of electrical energy.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. Apparatus for the inspection of glass containers or analogous articles for the presence of cracks, bubbles and/or other defects, comprising means for locating an article to be inspected in a predetermined position at a testing station; a light source; a source of electric energy; and a rotary testing unit comprising rotary carrier means movable to and from an operative position in which said carrier means is adjacent to an article at said station, photosensitive detector means mounted on said carrier means and comprising light conducting means arranged to conduct light from said light source and having a portion which directs such light against a selected portion of an article at said station in the operative position of said carrier means, at least one photosensitive receiver mounted on said carrier means in such position as to produce signals when the light directed by said portion of said light conducting means impinges on defects in the selected portion of an article at said station, amplifier means on said carrier means and electrically connected with said receiver to amplify said signals, and conductor means comprising first slip ring means on said carrier means and connected with said amplifier means and first brush means connected with said source of energy and energizing said first slip ring means at least in the operative position of said carrier, and second slip ring means on said carrier and connected to said amplifier means and second brush means engaging said second slip ring means at least in the operative position position of said carrier so as to transmit the amplified signals to means adapted to act on a defective article.

2. Apparatus as defined in claim 1, wherein said detector means is adjustable with reference to said carrier means.

3. Apparatus as defined in claim 1, wherein said light source is remote from said testing unit and said light conducting means comprises an elongated light conducting element extending through said carrier means and having an end located in the path of light issuing from said source.

4. Apparatus as defined in claim 3, wherein said portion of said light conducting means is adjacent to said receiver.

5. Apparatus for the inspection of hollow portions of articles at said station, as defined in claim 1, wherein said portion of said light conducting means extends into the interior of the hollow portion of an article at said station in the operative position of said carrier means.

6. Apparatus as defined in claim 5, wherein said portion of said light conducting means comprises at least one facet which directs light against the internal surface of the hollow portion of an article at said station in the operative position of said carrier means.

7. Apparatus as defined in claim 6, wherein said detector means comprises a plurality of receivers and said portion of said light conducting means is provided with a plurality of facets each of which emits light which cooperates with one of said receivers.

8. Apparatus as defined in claim 5, wherein said receiver is located in the interior of the hollow portion of an article at said station in the operative position of said carrier means.

9. Apparatus as defined in claim 5, wherein said receiver is located without the hollow portion of an article at said station in the operative position of said carrier means.

10. Apparatus as defined in claim 5, wherein at least said portion of said light conducting means constitutes a solid rod.

11. Apparatus as defined in claim 1, wherein said detector means comprises a plurality of receivers and said portion of said light conducting means comprises a plurality of bundles of light conducting fibers each arranged to direct light directly against an article at said station, said light conducting means further comprising a light conducting element having a first end portion receiving light from said source and a second end portion transmitting light to said bundles.

12. Apparatus as defined in claim 1, wherein at least a part of said light conducting means is coaxial with said testing unit.

13. Apparatus as defined in claim 1, further comprising a stabilizing circuit installed on said carrier means between said first slip ring means and said amplifier means.

14. Apparatus as defined in claim 1, wherein said light source is supported by said carrier means and said light conducting means further comprises at least one bundle of light conducting fibers arranged to conduct light from said source directly against an article at said station.

15. Apparatus as defined in claim 14, wherein said bundle and said portion of said light conducting means are adjustable with reference to said carrier means.

16. Apparatus as defined in claim 1, wherein said light source shares the movements of said carrier means and includes at least one electric lamp, and wherein said conductor means comprise also a conductor connecting said first slip ring means with said lamp.

17. Apparatus as defined in claim 1, wherein said source of electric energy is a source of A-C current and including rectifier means in said conductor means and a stabilizing circuit provided in said conductor means between said amplifier means and said rectifier means.

* * * * *